United States Patent
Farooq et al.

(10) Patent No.: US 9,821,754 B2
(45) Date of Patent: Nov. 21, 2017

(54) SPRING ASSIST LOCK AND RELEASE LOWER LEG FRONT-END STIFFENER

(71) Applicant: Ford Global Technologies, LLC, Dearborn, MI (US)

(72) Inventors: S. M. Iskander Farooq, Novi, MI (US); Srinivasan Sundararajan, Ann Arbor, MI (US); James Chih Cheng, Troy, MI (US); Mohammed Omar Faruque, Ann Arbor, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/054,552

(22) Filed: Feb. 26, 2016

(65) Prior Publication Data

US 2017/0247014 A1 Aug. 31, 2017

(51) Int. Cl.
| | |
|---|---|
| *B60J 7/00* | (2006.01) |
| *B60R 21/34* | (2011.01) |
| *B62D 25/08* | (2006.01) |
| *B60R 19/12* | (2006.01) |
| *B60R 21/00* | (2006.01) |

(52) U.S. Cl.
CPC .............. *B60R 21/34* (2013.01); *B60R 19/12* (2013.01); *B62D 25/08* (2013.01); *B60R 2021/0004* (2013.01); *B60R 2021/0053* (2013.01); *B60R 2021/343* (2013.01)

(58) Field of Classification Search
CPC ... B60R 19/12; B60R 2021/343; B60R 21/34; B60R 2021/0004; B60R 2021/0053; E05Y 2900/531; B62D 25/06; B62D 25/08; B60G 13/003; B65H 2511/514; B65H 2515/34; B65H 2220/01; B65H 2220/02; H01L 2924/00014
USPC ..... 296/187.04, 187.03, 187.09, 203.02, 204
See application file for complete search history.

(56) References Cited

U.S. PATENT DOCUMENTS

| | | | | | |
|---|---|---|---|---|---|
| 1,642,233 | A | * | 9/1927 | Elliott | B60R 21/34 293/26 |
| 1,865,014 | A | * | 6/1932 | Karl | B60R 21/34 293/24 |
| 2,179,163 | A | * | 11/1939 | Roth | B60R 21/34 293/118 |
| 3,677,595 | A | * | 7/1972 | Hamilton | B60R 19/40 293/118 |
| 3,771,824 | A | * | 11/1973 | Applegate | B60R 19/26 293/131 |
| 3,913,963 | A | * | 10/1975 | Persicke | B60R 19/56 180/274 |

(Continued)

FOREIGN PATENT DOCUMENTS

| | | |
|---|---|---|
| JP | 200474972 A | 3/2004 |
| KR | 100691199 | 2/2007 |

*Primary Examiner* — Kiran B Patel
(74) *Attorney, Agent, or Firm* — Frank A. MacKenzie; Bejin Bieneman PLC

(57) ABSTRACT

A vehicle front-end stiffener includes a hinge bracket pivotally coupled to a support bracket. The hinge bracket supports a stiffener beam. A spring engages the support bracket and the hinge bracket biasing the stiffener beam in a deployed position. A moving element in a locking mechanism can retractably interlock the hinge bracket when a vehicle exceeds a threshold speed to maintain the stiffener beam in the deployed position.

9 Claims, 8 Drawing Sheets

(56) References Cited

U.S. PATENT DOCUMENTS

| | | | | |
|---|---|---|---|---|
| 3,947,061 | A * | 3/1976 | Ellis | B60R 19/40 293/118 |
| 3,992,047 | A * | 11/1976 | Barenyi | B60R 21/34 293/117 |
| 4,093,290 | A | 6/1978 | Pearson | |
| 4,247,138 | A * | 1/1981 | Child | B60R 19/56 293/103 |
| 4,514,002 | A * | 4/1985 | McIntosh | B60R 19/56 293/118 |
| 4,541,661 | A * | 9/1985 | Hawk | B60R 3/00 182/89 |
| 4,641,871 | A * | 2/1987 | Vaughn | B60T 7/22 180/275 |
| 4,659,130 | A * | 4/1987 | Dimora | B62D 35/005 293/118 |
| 4,951,994 | A * | 8/1990 | Miwa | B62D 35/005 180/903 |
| 4,979,770 | A * | 12/1990 | Shal-Bar | B60R 19/56 293/131 |
| 5,360,311 | A * | 11/1994 | Lutz | B60P 1/6409 293/118 |
| 5,390,904 | A * | 2/1995 | Rivard | E05F 1/1207 16/289 |
| 6,089,628 | A * | 7/2000 | Schuster | B60R 19/12 293/118 |
| 6,176,529 | B1 * | 1/2001 | Kitzmiller | B60R 19/56 293/102 |
| 6,196,620 | B1 * | 3/2001 | Haraway, Jr. | B62D 35/007 180/903 |
| 6,224,120 | B1 * | 5/2001 | Eipper | B60R 19/40 293/115 |
| 6,460,909 | B2 * | 10/2002 | Mansoor | B60R 19/12 293/112 |
| 6,726,260 | B1 * | 4/2004 | Wang | B60R 19/12 293/117 |
| 6,764,118 | B2 * | 7/2004 | DePottey | B60R 19/40 293/118 |
| 6,886,883 | B2 * | 5/2005 | Jacquemard | B62D 35/005 180/903 |
| 6,974,166 | B2 * | 12/2005 | Ledford | B60R 19/56 293/102 |
| 8,113,555 | B2 | 2/2012 | Faruque | |
| 8,562,067 | B2 * | 10/2013 | Hoelzel | B62D 35/005 296/180.1 |
| 8,950,800 | B1 * | 2/2015 | Farooq | B60R 21/34 293/118 |
| 9,102,290 | B1 * | 8/2015 | Cuddihy | B60R 19/023 |
| 9,102,366 | B1 * | 8/2015 | Kim | B62D 35/005 |
| 9,254,801 | B2 * | 2/2016 | Sogabe | B60R 19/12 |
| 9,266,571 | B2 * | 2/2016 | D'Arcy | B62D 35/005 |
| 9,366,068 | B2 * | 6/2016 | Krajenke | E05F 1/1207 |
| 9,394,012 | B2 * | 7/2016 | Reuvekamp | B62D 35/005 |
| 9,517,802 | B1 * | 12/2016 | Froling | B62D 35/02 |
| 9,561,827 | B2 * | 2/2017 | Parry-Williams | B62D 37/02 |
| 9,586,555 | B2 * | 3/2017 | Revankar | B60R 21/34 |
| 2003/0137156 | A1 * | 7/2003 | Ledford | B60R 19/56 293/102 |
| 2005/0017519 | A1 * | 1/2005 | Regnell | B60R 19/56 293/118 |
| 2007/0125589 | A1 | 6/2007 | Murphy | |
| 2007/0246944 | A1 * | 10/2007 | Sundararajan | B60R 21/38 292/92 |
| 2008/0157547 | A1 * | 7/2008 | Baumann | B60R 19/40 293/118 |
| 2009/0152880 | A1 * | 6/2009 | Donovan | B60R 19/40 293/4 |
| 2009/0242308 | A1 * | 10/2009 | Kitte | B60R 21/36 180/271 |
| 2013/0341110 | A1 * | 12/2013 | Butlin, Jr. | B62D 35/005 180/68.1 |
| 2014/0076645 | A1 * | 3/2014 | McDonald | B62D 35/005 180/68.1 |
| 2015/0054307 | A1 * | 2/2015 | Kito | B60R 21/34 296/187.04 |
| 2015/0151700 | A1 * | 6/2015 | Revankar | B60R 19/40 293/102 |
| 2015/0183395 | A1 * | 7/2015 | Revankar | B60R 19/40 180/274 |
| 2015/0191145 | A1 * | 7/2015 | Farooq | B60R 21/38 180/274 |
| 2016/0068127 | A1 * | 3/2016 | Faruque | B60R 19/12 293/117 |

\* cited by examiner

SPRING ASSIST LOCK AND RELEASE LOWER LEG FRONT-END STIFFENER

BACKGROUND

The Global Technology Regulation (GTR) and the New Car Assessment Program (NCAP) in Europe and Japan specify leg-injury criteria for pedestrian protection. The regulations are aimed at preventing the legs of a pedestrian from sliding under a vehicle 10 bumper during a vehicle-pedestrian impact.

Light duty trucks and sport utility vehicles (SUVs), for example, may have a relatively high bumper height that could allow the lower leg to bend and slide under the bumper. Specifically, light duty trucks have relatively higher bumper heights to provide ground clearance to clear speed bumps, curbs, parking blocks, inclined driveway ramps, hills, rough roads, etc. at lower speeds. Some SUVs and light duty trucks also have off-road capabilities at low speed that preclude having any components below the bumper. As such, there is an opportunity to design a vehicle front-end for pedestrian leg impact energy management while addressing ground clearance requirements.

DETAILED DESCRIPTION

Figure 1:
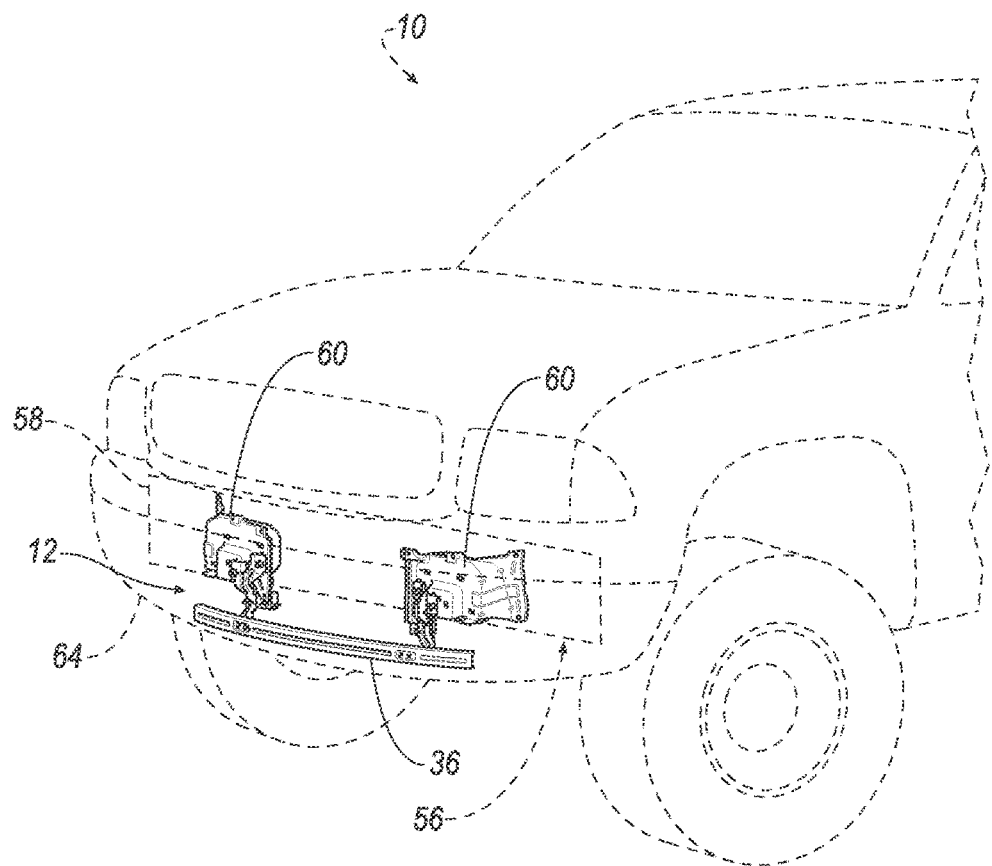
FIG. 1 is a perspective view of a front end of a vehicle including front-end stiffener shown in hidden lines.

With reference to the Figures, wherein like numerals indicate like parts throughout the several views, a front-end stiffener 12 for a vehicle 10 includes a hinge bracket 14 pivotally coupled to a support bracket 24. The hinge bracket 14 supports a stiffener beam 36. A spring 40 engages the support bracket 24 and the hinge bracket 14 biasing the stiffener beam 36 in a deployed position.

Figure 3:
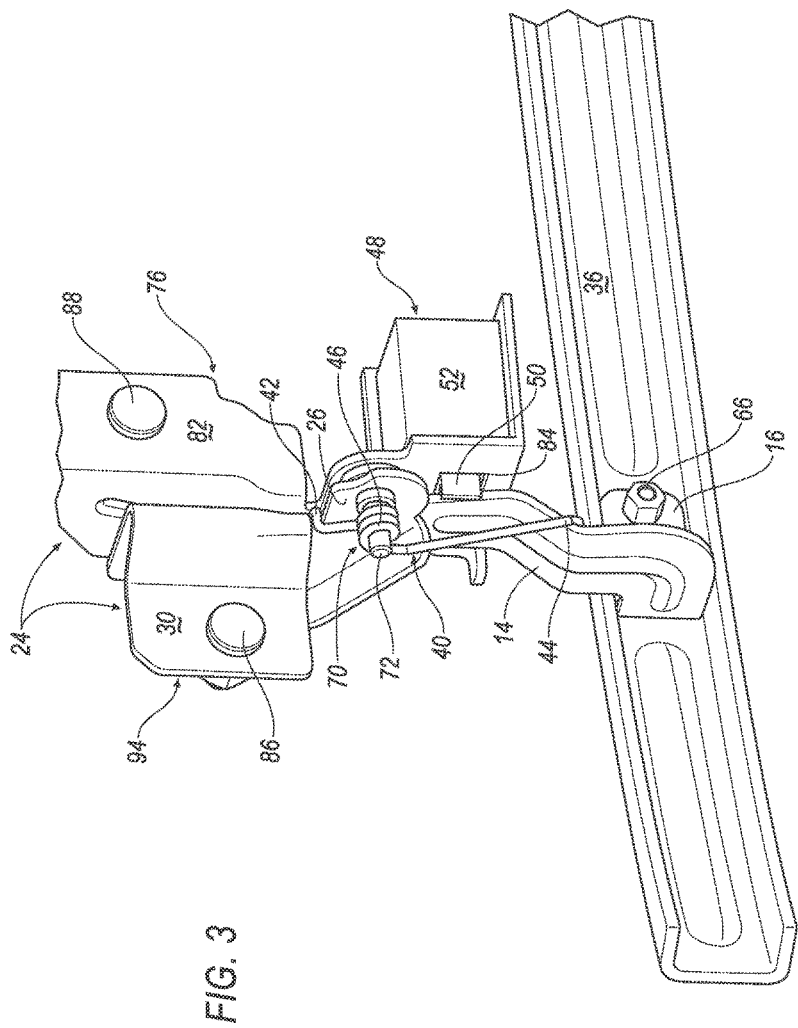
FIG. 3 is a perspective view of a rear side of a portion of the front-end stiffener showing a moveable element of a locking mechanism interlocking with a hinge bracket.
Figure 4:
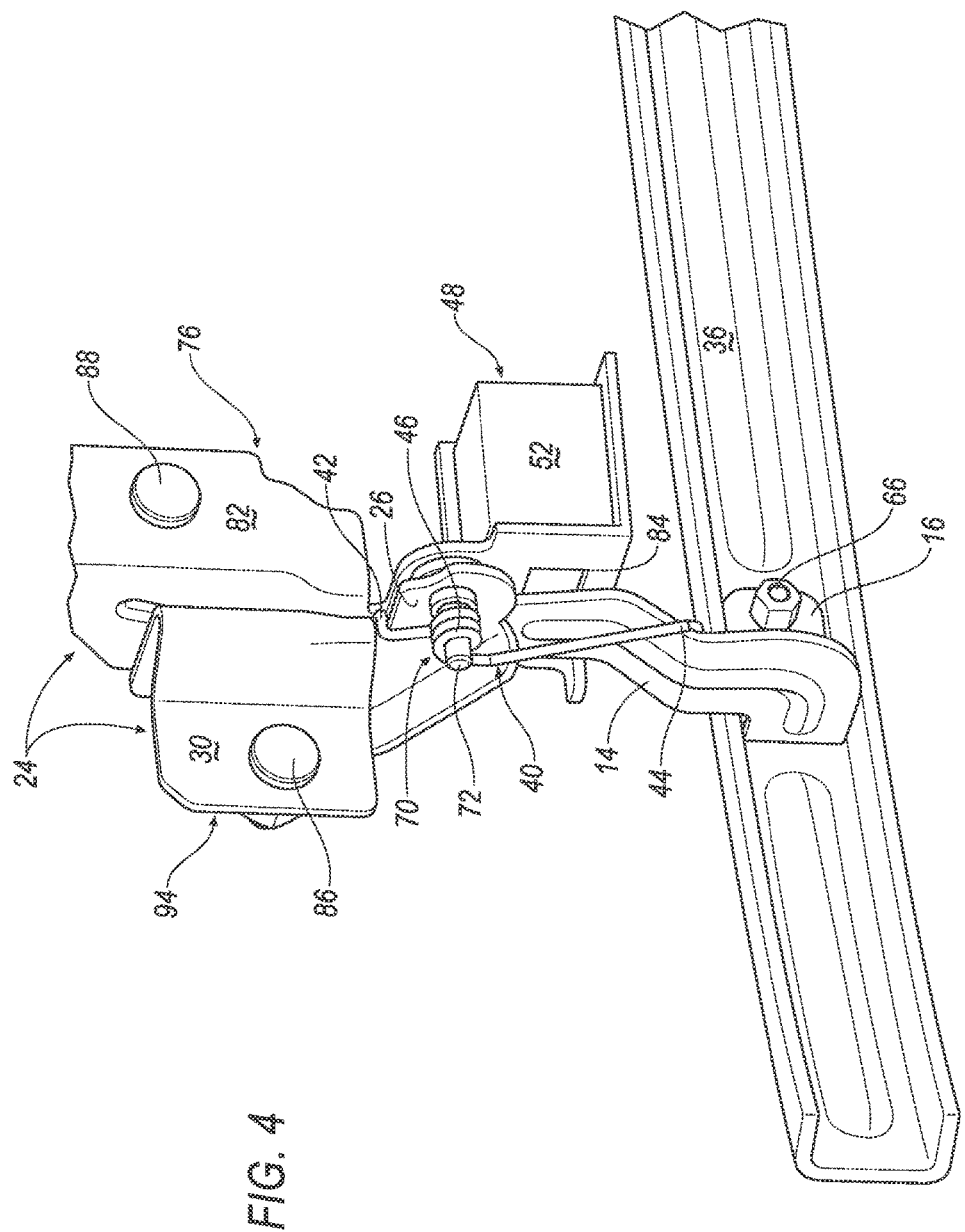
FIG. 4 is the same view of the front-end stiffener shown in FIG. 3, showing the moveable element of the locking mechanism in a retracted position.
Figure 5:
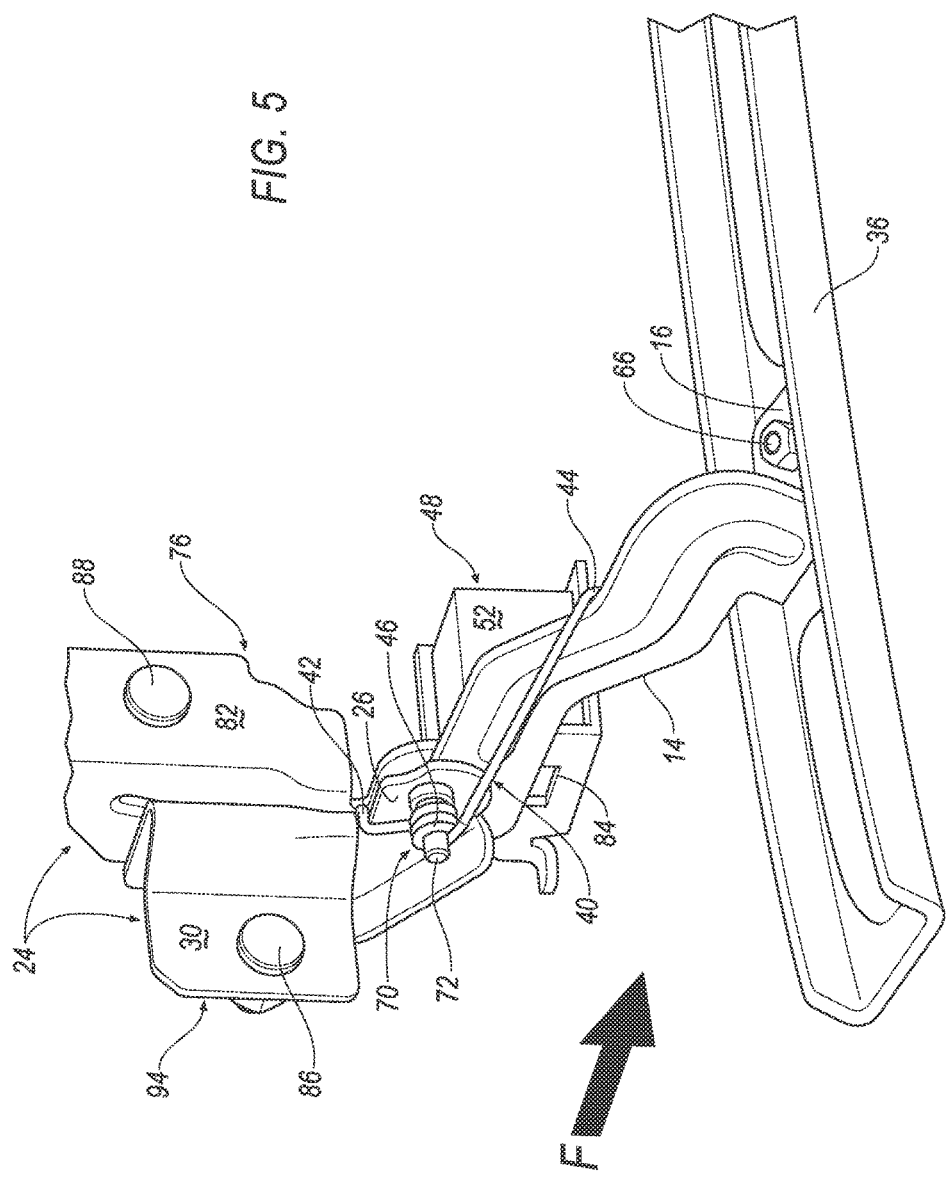
FIG. 5 is the same view of the front-end stiffener shown in FIG. 3, showing the stiffener beam in an undeployed position.

The stiffener beam 36 is moveable between the deployed position, shown in FIGS. 1-4, and an undeployed position, shown in FIG. 5. The stiffener beam 36 may be rotatably moved from the deployed position to the undeployed position in an upwardly, vehicle-rearward path. For example, as set forth further below, the spring 40 may bias the stiffener beam 36 in the deployed position to provide reinforcement that may be beneficial for pedestrian leg impact requirements. In contrast, the spring 40 may allow the hinge bracket 14 to pivot relative to the support bracket 24 such that the stiffener beam 36 may be moved from the deployed position to the undeployed position when the stiffener beam 36 contacts ground obstacles such as speed bumps, curbs, parking blocks, inclined driveways, ramps, hills, rough roads, etc., to reduce the likelihood of damage to the stiffener beam 36. As another example, the spring 40 may allow the hinge bracket 14 to move relative to the support bracket 24 when the vehicle 10 is used in an off-road use, where impact with ground obstacles may be more likely.

As further detailed below, the front-end stiffener 12 may include a locking mechanism 48 with a moveable element 50 that retractably engages the hinge bracket 14 and the support bracket 24 to maintain the stiffener beam 36 in the deployed position when the vehicle 10 exceeds a threshold speed, e.g., greater than 25 KPH. When the vehicle 10 is traveling at or below the threshold speed, and/or in an off-road use, the moveable element 50 of the locking mechanism 48 may be retracted to disengage the hinge bracket 14 to allow the hinge bracket 14 to rotate relative to the support bracket 24 in an upward, vehicle-rearward path. If the stiffener beam 36 contacts ground obstacles such as speed bumps, curbs, parking blocks, inclined driveways, ramps, hills, rough roads, etc., when the moveable element 50 is retracted, then the stiffener beam 36 may rotatably move to the undeployed position, after which the spring 40 resiliently biases the stiffener beam 36 back to the deployed position when the ground obstacle is cleared. The front-end stiffener 12 thereby minimizes complicated linkages and mechanisms, reducing the cost and complexity of manufacture and front-end stiffener 12, while also increasing reliability and durability.

Figure 2:
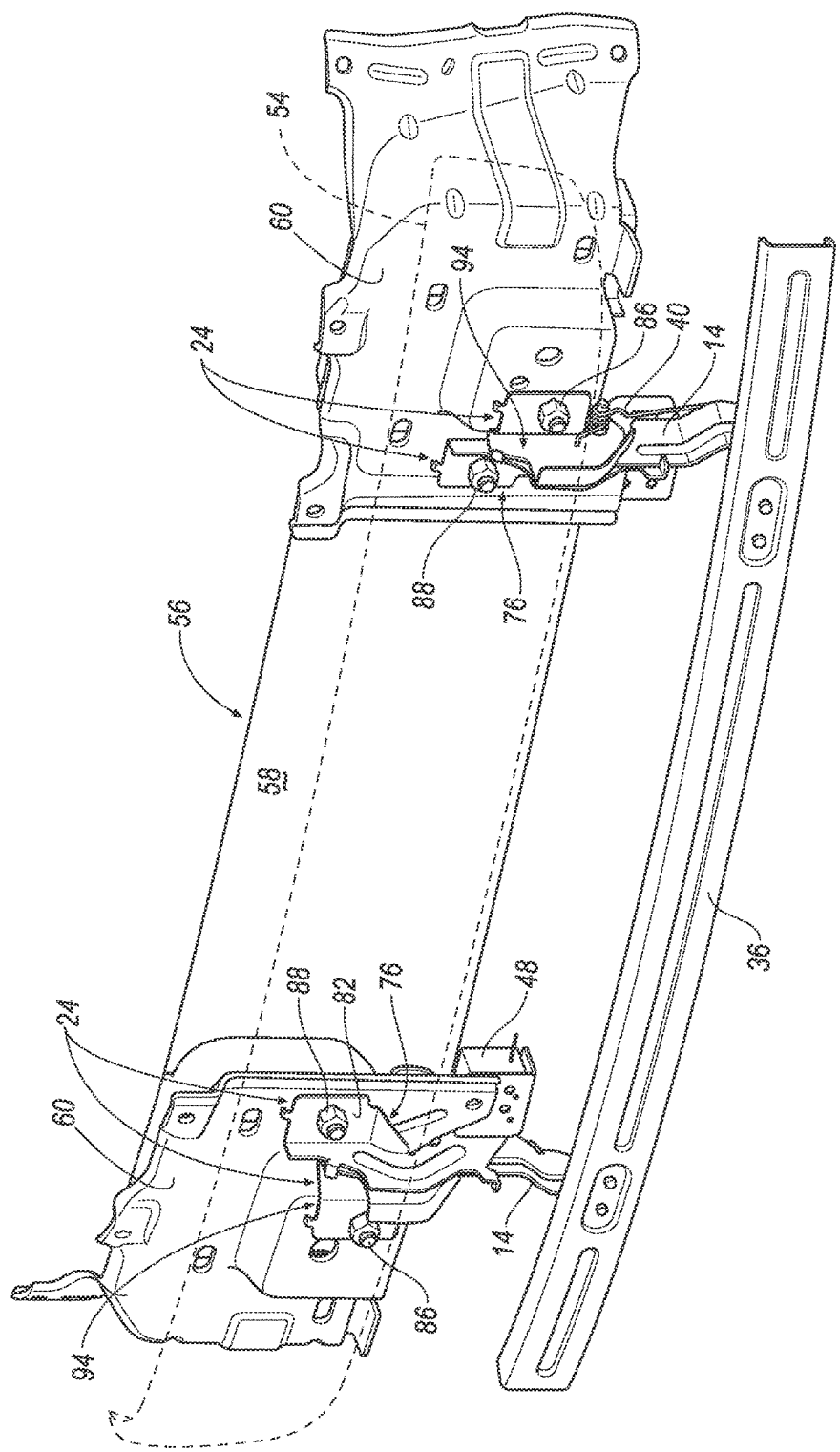
FIG. 2 is a perspective view of the vehicle assembly of FIG. 1 showing a stiffener beam of the front-end stiffener in a deployed position.

With reference to FIGS. 1 and 2, the vehicle 10 may include a bumper 54. The bumper 54 may be supported by a frame 56 of the vehicle 10, which may include rails (not shown) that extend in a vehicle fore-aft direction. The bumper 54 may include bumper reinforcement brackets 60 supporting the front-end stiffener 12, as set forth further below.

In the example of the front-end stiffener 12 shown in the Figures, in the deployed position, the stiffener beam 36 is below and forward of a front end 58 of the vehicle frame 56, and extends in a cross-vehicle direction. The stiffener beam 36 may be formed from metal such as steel or aluminum, plastic, a carbon fiber composite, etc. The stiffener beam 36 is sufficiently rigid for pedestrian leg impact energy management.

With reference to FIG. 1, the vehicle 10 may include a fascia 64. The front-end stiffener 12 may be hidden from view by the fascia 64, which may be, for example, in a vehicle-forward position relative to the front-end stiffener 12. The fascia 64 may have a class-A surface finish, i.e., a surface specifically manufactured to have a high quality, finished aesthetic appearance free of blemishes. In cases where the bumper beam 54 is exposed without a fascia, a lower air deflector (not shown) may be designed in front of the stiffener beam 36 to hide the front-end stiffener 12 from view.

As set forth above, the front-end stiffener 12 includes the hinge bracket 14 and the support bracket 24. Specifically, as shown in the Figures, the front-end stiffener 12 may include a pair of hinge brackets 14 and support brackets 24. Alternatively, the front-end stiffener 12 may include any suitable number of hinge brackets 14 and support brackets 24. The hinge brackets 14 and the support brackets 24 may be formed of metal, such as steel, aluminum, etc., or any other suitable materials.

Figure 6:
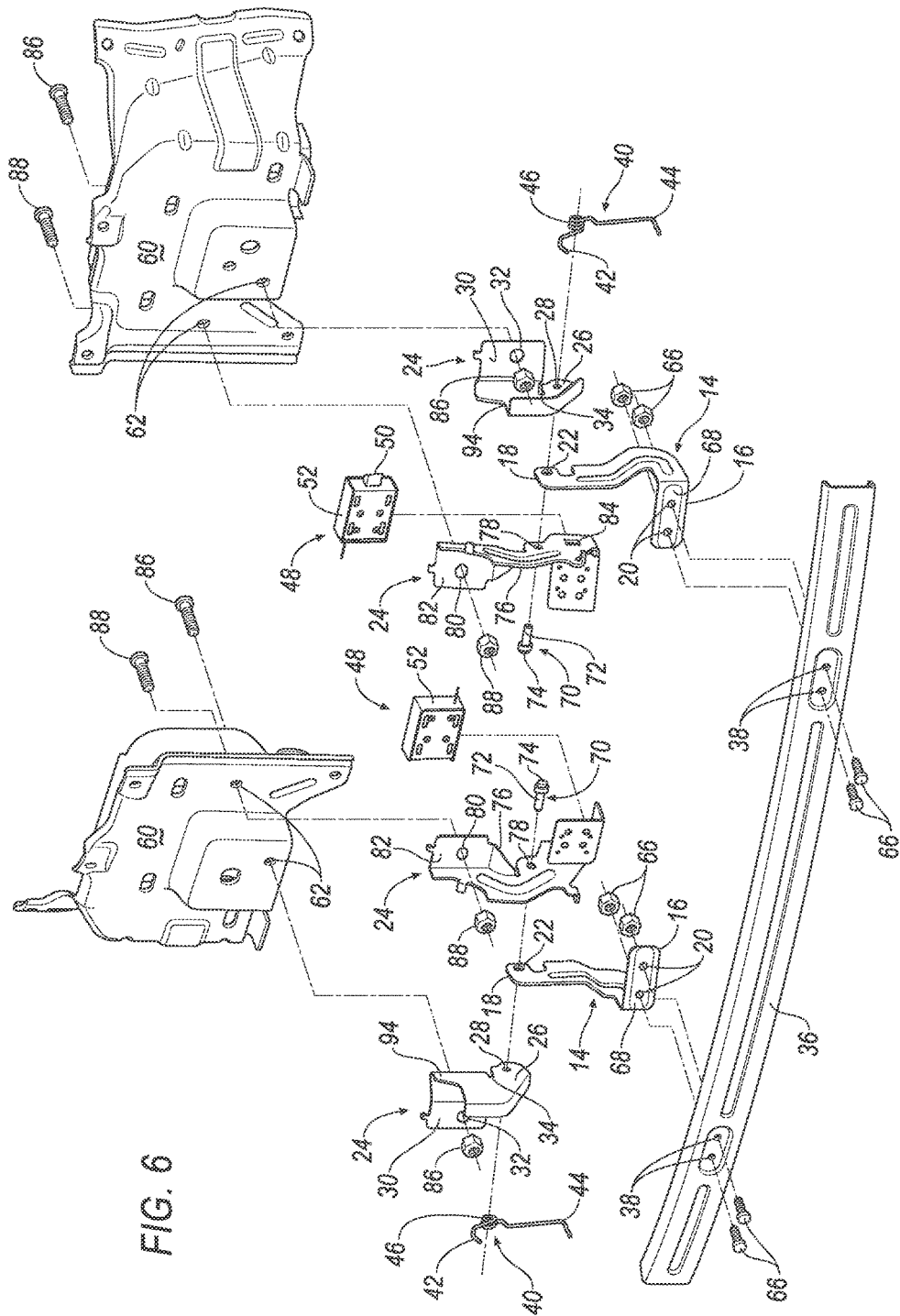
FIG. 6 is an exploded view of the example of the front-end stiffener.

Referring now to FIG. 6, a first end 16 of the hinge bracket 14 may define one or more holes 20. The stiffener beam 36 may also define holes 38 that align with the holes 20 of the hinge bracket 14. Fasteners 66, such as threaded bolts, can extend through the holes 38 of the stiffener beam 36 and into the aligned holes 20 of the hinge bracket 14 to removably mount the stiffener beam 36 to the hinge bracket 14. A separation element 68, e.g., a rubber gasket, may be inserted between the stiffener beam 36 and the hinge bracket 14. One example where inserting the separation element 68 between the stiffener beam 36 and the hinge bracket 14 may be desirable is if the stiffener beam 36 and the hinge bracket 14 are formed of dissimilar metals. Alternatively, the hinge bracket 14 may be welded or otherwise fixedly joined to the stiffener beam 36 in any suitable manner.

A second end 18 of the hinge bracket 14 is pivotally connected to the support bracket 24. For example, the second end 18 of the hinge bracket 14 may define an aperture 22.

As shown in FIGS. 2-6, the support bracket 24 may include a first segment 76 and a second segment 94. The first segment 76 and the second segment 94 may sandwich the hinge bracket 14 therebetween. Alternatively, the support bracket 24 may be one-piece.

The first segment 76 may be configured such that the locking mechanism 48 can be removably mounted to the first segment 76. The first segment 76 may also define an aperture 78 that aligns with the aperture 22 in the hinge bracket 14.

The first segment 76 may include a portion 82 that defines at least one hole 80 that aligns with at least one hole 62 in the bumper reinforcement bracket 60. Referring again to FIG. 6, fasteners 88 such as threaded bolts can extend through the at least one hole 62 of the bumper reinforcement bracket 60 into the at least one aligned hole 80 of the first segment 76 to removably mount the first segment 76 to the bumper reinforcement bracket 60.

Alternatively, the first segment 76 may be welded or otherwise fixedly joined to the bumper reinforcement bracket 60 in any suitable manner. The first segment 76 may also be removably mounted, welded, or otherwise fixedly joined directly to the vehicle frame 56. The first segment 76 may be formed of metal, such as steel, aluminum, etc., or any other suitable materials.

The second segment 94 of the support bracket 24 may include a first portion 26 and a second portion 30. The first portion 26 may define an aperture 28 that aligns with the aperture 22 in the hinge bracket 14.

The second portion 30 may extend transversely relative to the first portion 26. The second portion 30 may define at least one hole 32. The bumper reinforcement bracket 60 mounted to the vehicle frame 56 may also define at least one hole 62 that aligns with the at least one hole 32 defined by the second portion 30. As shown in FIG. 6, fasteners 86, e.g., threaded bolts, can extend through the at least one hole 62 of the bumper reinforcement bracket 60 into the at least one aligned hole 32 of the second segment 94 of the support bracket 24 to removably mount the support bracket 24 to the bumper reinforcement bracket 60.

Alternatively, the second segment 24 may be welded or otherwise fixedly joined to the bumper reinforcement bracket 60 in any suitable manner. The second segment 24 may also be removably mounted, welded, or otherwise fixedly joined directly to the vehicle frame 56. The second segment 94 may be formed of metal, such as steel, aluminum, etc., or any other suitable materials.

A pivot stud 70 may pivotally connect the support bracket 24 and the hinge bracket 14. Specifically, the pivot stud 70 may pivotally connect the hinge bracket 14 to both the first segment 76 and the second segment 94 of the support bracket 24. The pivot stud 70 may include a shaft 72. In the example shown in the Figures, the shaft 72 of the pivot stud 70 can extend through the aperture 78 of the first segment 76 of the support bracket 24, the aperture 22 of the hinge bracket 14, and the aperture 28 of the second segment 94 of the support bracket 24.

The pivot stud 70 can have a head 74 with the shaft 72 extending from the head 74. The head 74 of the pivot stud 70 has a perimeter that is greater than a perimeter of at least one of the apertures 22, 28, and 78 of the first segment 76, the hinge bracket 14, and the second segment 94. The head 74 of the pivot stud 70 may abut the first segment 76, the hinge bracket 14, or the second segment 94, with the shaft 72 of the pivot stud 70 extending through the apertures 22, 28, and 78 to pivotally connect the first segment 76, the hinge bracket 14, and the second segment 94. The pivot stud 70 can be formed of metal, e.g., steel or aluminum.

As set forth above, the locking mechanism 48 may include the moveable element 50 that retractably engages the hinge bracket 14 and the support bracket 24 to maintain the stiffener beam 36 in the deployed position. Specifically, the locking mechanism 48 may include a base 52, and the moveable element 50 may extend from and retract into the base 52. The locking mechanism may be of any suitable type, e.g., a solenoid.

As shown in the example shown in the Figures, the base 52 of the locking mechanism 48 may be fixed to the first segment 76 of the support bracket 24, and the moveable element 50 may extend from the base 52 and into engagement with the hinge bracket 14, i.e., to prevent the hinge bracket 14 from pivotally moving along an upward, vehicle-rearward path. In FIG. 3, the moveable element 50 is an extended position, retractably engaging the hinge bracket 14 to maintain the stiffener beam 36 in the deployed position. In FIG. 4, the moveable element 50 is in a retracted position, not retractably engaging the hinge bracket 14. As shown in FIGS. 3 and 4, the first segment 76 of the support bracket 24 may also define an opening 84 through which the moveable element 50 of the locking mechanism 48 can extend and retract. Alternatively, for example, the base 52 of the locking mechanism 48 may be fixed to the hinge bracket 14, and the moveable element 50 may retractably extend from the base 52 into engagement with the support bracket 24, i.e., to interlock with the support bracket 24.

Referring still to FIG. 4, when the movable element 50 of the locking mechanism 48 is in the retracted position, the spring 40 biases the stiffener beam 36 in the deployed position. The spring 40 may have a first end 42 engaging the second segment 94 of the support bracket 24. The second segment 94 of the support bracket 24 may include a notch 34 to secure the first end 42 of the spring 40. A second end 44 of the spring 40 engages the hinge bracket 14. A body 46 of the spring 40 may be mounted to the shaft 72 of the pivot stud 70. The spring 40 is configured such that it exerts a force on the hinge bracket 14 that biases the stiffener beam 36 in the deployed position. The spring 40 may be made of metal, e.g., steel or aluminum, and be of any suitable kind, such as a torsion spring.

As shown in FIG. 5, when the moveable element 50 of the locking mechanism 48 is in the retracted position, the stiffener beam 36 may be subject to an external force of sufficient magnitude (as represented by the arrow F) to overcome the force exerted by the spring 40 on the hinge bracket 14. In that case, the stiffener beam 36 may rotatably move upwardly and in the vehicle-rearward direction to the undeployed position. When the external force dissipates, or the magnitude of the external force is less than the force the spring 40 exerts on the hinge bracket 14, the spring 40 will bias the stiffener beam 36 to the deployed position.

Figure 7:
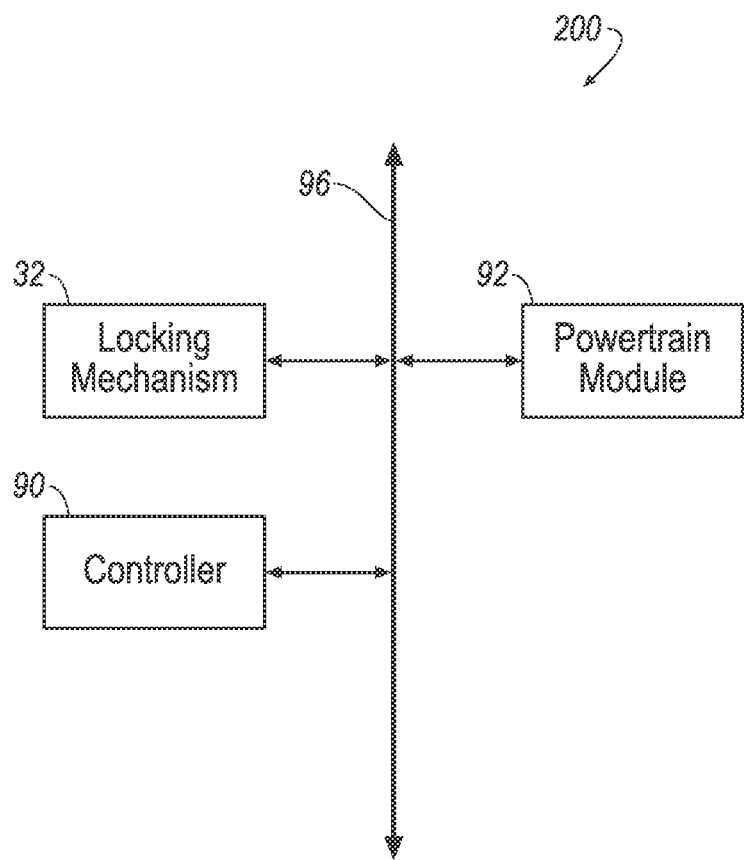
FIG. 7 is a schematic of a control system.

With reference to FIG. 7, the vehicle 10 may include a control system 200 including a controller 90 in communication with the locking mechanism 32. The controller 90 may be a microprocessor-based processor. The controller 90 may include a processor, memory, etc. The memory of the controller 90 may store instructions executable by the processor. A sensor (not shown) is in communication with the controller 90 to communicate data to the controller 90. Based on the data communicated to the control system 200, the controller 90 instructs the locking mechanism 48 to position the moveable element 50 of the locking mechanism 48 to be extended from or retracted relative to the base 52.

The control system 200 may transmit signals through a communication network 96 (such as a controller area network (CAN) bus), Ethernet, and/or by any other wired or wireless communication network. The controller 90 may use information from the communication network to control the locking mechanism 48. The locking mechanism 48 may be connected to the controller 90, or may be connected directly to the communication network 96.

The control system 200 may be in communication with a powertrain module 92 of the vehicle 10. Specifically, the powertrain module 90 may transmit a signal to the control system indicating the speed of the vehicle 10.

The controller 90 is programmed to move the locking mechanism 48 to a locked position, i.e., with the moveable element 50 extended from the base 52 when the vehicle 10 travels above a threshold speed. Specifically, when the vehicle 10 travels above the threshold speed, the controller 90 may instruct the locking mechanism 48 such that the moveable element 50 extends from the base 52 and interlocks the support bracket 24 and the hinge bracket 14 to lock the stiffener beam 36 in the deployed position. When the vehicle 10 travels below the threshold speed, the controller 90 may instruct the locking mechanism 48 such that the moveable element 50 is retracted relative to the base 52, which allows for relative rotation between the hinge bracket 14 and the support bracket 24 to allow the stiffener beam 36 to be rotated to the undeployed position if impacted by a ground obstacle. The threshold speed may be, for example, 25 KPH.

Some vehicles, e.g., light duty trucks, may be operable in an Off-Road mode in which certain vehicle systems (suspension and/or powertrain, for example) have settings adapted for operation on unpaved, rough surfaces and, usually, at lower speeds. Such an Off-Road mode may be selected manually by the vehicle operator (if such a switch option is provided for the operator) and/or may be triggered automatically based on certain detected parameters. When the vehicle 10 is operating in an Off-Road mode, it is expected that it will be traveling in an area in which pedestrians are not likely to be present, and it is assumed that the vehicle 10 will require the largest possible ground clearance to avoid striking obstacles. Therefore, in the Off-Road mode, the moveable element 50 of the locking mechanism 48 may be retained in the retracted position regardless of the vehicle speed.

Figure 8:
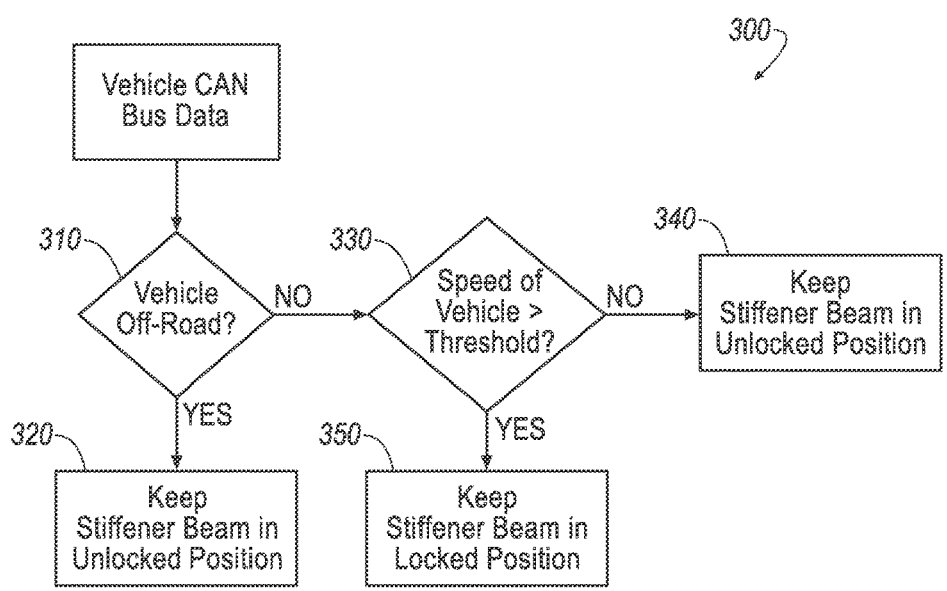
FIG. 8 is one example of a speed-based deployment logic.

FIG. 8 illustrates an example of speed-based retractable engagement logic 300. At a block 310, if the vehicle control system 200 is in Off-Road mode, the movable element 50 of the locking mechanism 48 is in the retracted position, regardless of the vehicle speed, as shown in a box 320. If the vehicle control system 200 is not in an Off-Road mode, then in a box 330, the vehicle speed is checked to see if it exceeds the threshold speed, e.g. 25 KPH. If the vehicle speed exceeds the threshold speed, then at a block 350, the controller 90 sends a signal to the locking mechanism 48 to move the moveable element 50 to retractably engage the hinge bracket 14 and the support bracket 24, and maintain the stiffener beam 36 in the deployed position. If the vehicle speed is the same as or less than the threshold speed, then at a block 340, the controller 90 sends a signal to the locking mechanism 48 to move the moveable element 50 of the locking mechanism 48 to the retracted position.

The disclosure has been described in an illustrative manner, and it is to be understood that the terminology which has been used is intended to be in the nature of words of description rather than of limitation. Many modifications and variations of the present disclosure are possible in light of the above teachings, and the invention may be practiced otherwise than as specifically described.

What is claimed is:

1. A vehicle front end stiffener comprising:
   a support bracket;
   a hinge bracket pivotally coupled to the support bracket;
   a stiffener beam supported by the hinge bracket; and
   a spring between the support bracket and the hinge bracket biasing the stiffener beam in a deployed position; and
   a locking mechanism including a movable element retractably engaging one of the hinge bracket and the support bracket in the deployed position.

2. The vehicle front end stiffener of claim 1, wherein the spring has a first end and a second end, the first end of the spring engages the hinge bracket and the second end of the spring engages the support bracket.

3. The vehicle front end stiffener of claim 1 further comprising a pivot stud pivotally connecting the support bracket and the hinge bracket.

4. The vehicle front end stiffener of claim 3, wherein a body of the spring is mounted on the pivot stud.

5. The vehicle front end stiffener of claim 1, wherein the spring is a torsional spring.

6. The vehicle front end stiffener of claim 1, wherein at least one of the hinge bracket and the support bracket defines an opening aligned with the movable element in the deployed position.

7. The vehicle front end stiffener of claim 1, wherein the locking mechanism is a solenoid.

8. The vehicle front end stiffener of claim 1, wherein the locking mechanism locks the stiffener beam in the deployed position when the vehicle exceeds a threshold speed.

9. The vehicle front end stiffener of claim 1, wherein the locking mechanism is fixed to the support bracket.

* * * * *